(12) United States Patent
Tin

(10) Patent No.: US 12,452,106 B2
(45) Date of Patent: Oct. 21, 2025

(54) COMMUNICATION METHOD BASED ON QUANTUM CHANNEL ESTIMATION AND BASE STATION

(71) Applicant: Wistron Corporation, New Taipei (TW)

(72) Inventor: Hsiao-Wen Tin, New Taipei (TW)

(73) Assignee: Wistron Corporation, New Taipei (TW)

( * ) Notice: Subject to any disclaimer, the term of this patent is extended or adjusted under 35 U.S.C. 154(b) by 491 days.

(21) Appl. No.: 18/183,899

(22) Filed: Mar. 14, 2023

(65) Prior Publication Data

US 2024/0235897 A1 Jul. 11, 2024

(30) Foreign Application Priority Data

Jan. 10, 2023 (TW) ................................. 112101056

(51) Int. Cl.
*H04L 25/02* (2006.01)

(52) U.S. Cl.
CPC ...... *H04L 25/0224* (2013.01); *H04L 25/0248* (2013.01)

(58) Field of Classification Search
CPC .................. H04L 25/0224; H04L 25/0248
See application file for complete search history.

(56) References Cited

U.S. PATENT DOCUMENTS

2019/0074997 A1\* 3/2019 Shin ..................... H04L 25/0204
2020/0014533 A1\* 1/2020 Fung ..................... H04L 5/0007

\* cited by examiner

*Primary Examiner* — Natasha W Cosme
(74) *Attorney, Agent, or Firm* — JCIPRNET

(57) ABSTRACT

A communication method based on quantum channel estimation, including: sampling according to a sampling parameter to obtain an information block, wherein the sampling parameter is used to determine a time distance of a pilot signal; converting the information block into a quantum channel fingerprint; performing channel estimation according to the quantum channel fingerprint to obtain an estimation result; and performing signal transmission according to the estimation result.

20 Claims, 6 Drawing Sheets

COMMUNICATION METHOD BASED ON QUANTUM CHANNEL ESTIMATION AND BASE STATION

CROSS-REFERENCE TO RELATED APPLICATION

This application claims the priority benefit of Taiwan application serial no. 112101056, filed on Jan. 10, 2023. The entirety of the above-mentioned patent application is hereby incorporated by reference herein and made a part of this specification.

BACKGROUND

Technical Field

The disclosure relates to a wireless communication technology, and in particular relates to a communication method based on quantum channel estimation and a base station.

Description of Related Art

With the popularity of smart phones and other devices, the rapid growth of wireless data volume has prompted the need for fast wireless communication technologies that may provide higher capacity. Multiple-input multiple-output (MIMO) communication technology improves the operation mode of wireless communication and improves the utilization rate of network resources. For example, 3G technology introduces single-user MIMO (SU-MIMO) technology, which uses multiple antennas to transmit and receive simultaneously, and uses multiple synchronous data streams to transmit data from the base station to a single user to make full use of space resources. In 4G, multi-user MIMO (MU-MIMO) technology is used to distribute different data streams to different users or terminal equipment and communicate with multiple terminal equipment simultaneously. In 4G application scenarios, base stations usually only use fewer than 10 antennas to improve frequency spectrum efficiency, but the architecture of 4G base stations still does not meet the specification requirements of 5G application scenarios. The massive MIMO technology adopted in 5G, or referred to as large scale antenna systems, may support more synchronous connections and transmissions.

Since massive MIMO adopts more antennas, the signal beam transmitted to the receiver are narrower, which allows the base station to transmit to the user (or terminal equipment) more accurately and efficiently. Different from the previous MIMO technology, massive MIMO increases the number of base station antennas from within ten to dozens or hundreds. Taking an array as an example, when serving dozens or more users (terminal equipment) simultaneously in the same time-frequency resource, each user (terminal equipment) usually has only a few antennas, but some antenna arrays may even reach 256×256 scale.

In Massive MIMO technology, the number of antennas are increased and the power of the target signal is enhanced, thereby enhancing SNR and reducing the impact of interference. According to the random matrix theory, when the number of antennas of the base station is much larger than the total number of users, the channels between the base station and different users approach orthogonality. Under good propagation conditions, simple linear signal processing, such as a matched filter, may be used to eliminate the influence of interference between users and noise. However, to achieve the above situation, to satisfy the assumption that the base station may obtain perfect channel state information (CSI) in the uplink from the pilot sequence sent by the user terminal. However, it is difficult to meet the requirements of this assumption for the Massive MIMO cellular network system, because the same pilot sequence is likely to be reused in different cells, or the pilot sequences between different cells are partially correlated. The effect caused by using the same non-orthogonal pilot sequence in different cells is called pilot contamination. Pilot contamination reduces the accuracy of channel estimation and thus reduces system performance.

SUMMARY

In view of this, the disclosure provides a communication method based on quantum channel estimation and a base station, which may adaptively describe in real-time communication characteristics in a time-varying channel environment through quantum channel fingerprint, and may respond to suddenly changing channel estimation, and obtain more channel data.

An embodiment of the disclosure provides a communication method based on quantum channel estimation, including the following operation. An information block is obtained through sampling according to a sampling parameter, in which the sampling parameter is used to determine a time interval of a pilot signal. The information block is converted into a quantum channel fingerprint. Channel estimation is performed according to the quantum channel fingerprint to obtain an estimation result. Signal transmission is performed according to the estimation result.

An embodiment of the disclosure provides a base station, including: a transceiver, a storage medium; and a processor coupled to the transceiver and the storage medium. The processor is configured for the following operation. An information block is obtained through sampling according to a sampling parameter, in which the sampling parameter is used to determine a time interval of a pilot signal. The information block is converted into a quantum channel fingerprint. Channel estimation is performed according to the quantum channel fingerprint to obtain an estimation result. Signal transmission is performed according to the estimation result.

DETAILED DESCRIPTION OF DISCLOSED EMBODIMENTS

Figure 1:
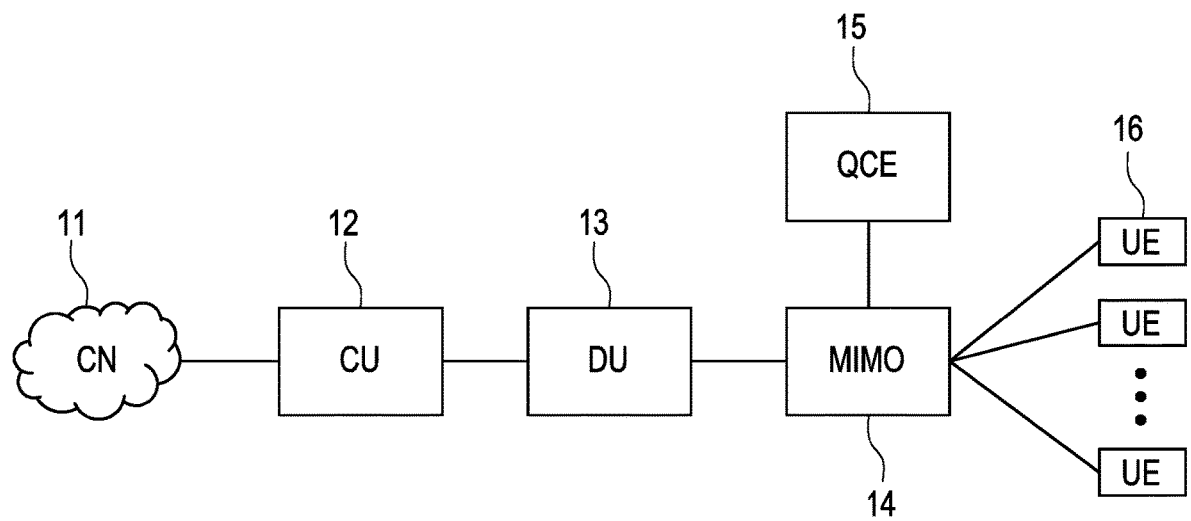
FIG. 1 is a schematic diagram of a communication system according to an embodiment of the disclosure.

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples within the scope of the patent application of the disclosure. Wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a schematic diagram of a communication system according to an embodiment of the disclosure. In the communication system 10, the application service is connected to the centralized unit (CU) 12 and the distributed unit (DU) 13 of the mobile communication via a core network (CN) 11. A massive antenna 14 is used on the fronthaul interface of the distribution unit 13 to simultaneously serve multiple user equipment (UE) 16 through multiple-input multiple-output (MIMO) technology. When a massive antenna 14 communicates with multiple user equipment via MIMO, the pilot contamination problem is a factor affecting the performance of the MIMO system. The most common way to solve this problem is to use orthogonal pilot sequences. Different cells may use different orthogonal pilot sequences to avoid the pilot contamination problem, but this also increases the training period and reduces the transmission efficiency, which does not meet the actual requirement.

Compared with the method of using the orthogonal pilot sequence in the prior art, the embodiment of the disclosure focuses on the problem of channel distribution based on the concept of quantum mechanics, and provides an adaptive solution for the description of channel characteristics. With the addition of the function of quantum channel estimation (QCE) 15 to the massive antenna 14 of the base station, the quantum channel fingerprint obtained by the base station using the quantum channel estimation 15 may adaptively transmit the correct beam to the user terminal according to the communication characteristics in the time-varying channel environment, thereby improving the transmission efficiency.

The communication model for communication between the massive antenna 14 and the user equipment 16 may be described by the following Formula (1):

$$y = Hx \quad (1)$$

In Formula (1), y is the received signal, x is the transmitted signal, and H is the channel matrix. Since the channel matrix H corresponding to each user equipment 16 is different, its channel coefficients are also different, so there are different transmission scenarios at different sampling times.

The embodiment of the disclosure is based on the concept of quantum mechanics. The quantum channel fingerprint obtained by using the quantum channel estimation 15 may be imagined as the communication characteristic of this transmission scenario. Just like the fingerprints of people are different, the quantum channel fingerprint is enough to represent a communication characteristic of a particular communication environment. In one embodiment, the quantum channel estimation 15 may be combined with space-time coding (STC) technology to obtain the quantum channel fingerprints corresponding to the transmission scenarios at different sampling times.

Figure 2:
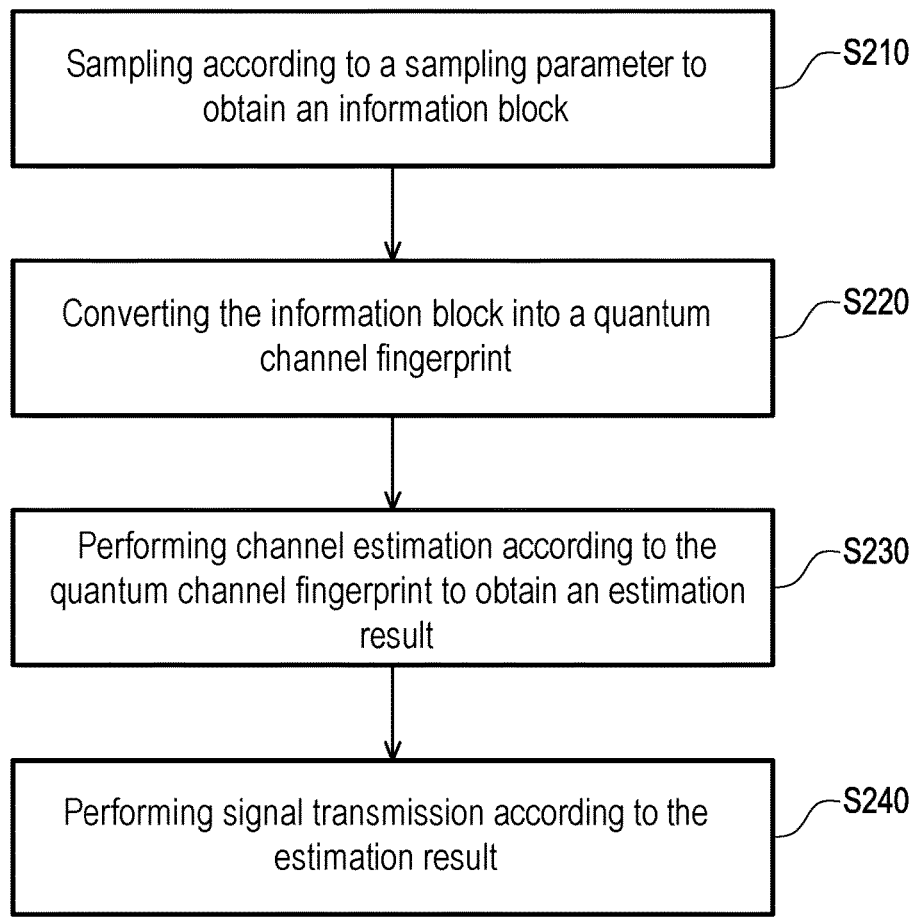
FIG. 2 is a flowchart of a communication method based on quantum channel estimation according to an embodiment of the disclosure.

FIG. 2 is a flowchart of a communication method based on quantum channel estimation according to an embodiment of the disclosure. In step S210, an information block is obtained through sampling according to a sampling parameter, in which the sampling parameter is used to determine a time interval of a pilot signal. In step S220, the information block is converted into a quantum channel fingerprint. In step S230, channel estimation is performed according to the quantum channel fingerprint to obtain an estimation result. In step S240, signal transmission is performed according to the estimation result.

Figure 3:
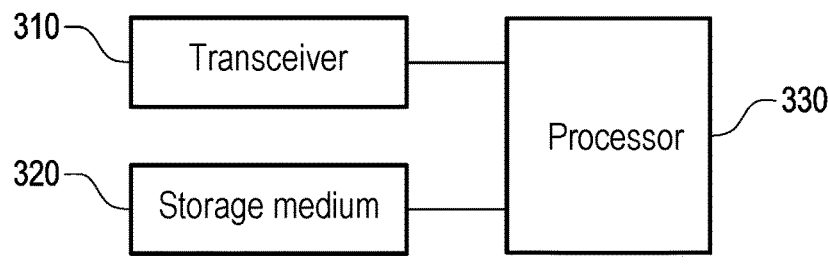
FIG. 3 is a schematic diagram of a base station according to an embodiment of the disclosure.

FIG. 3 is a schematic diagram of a base station according to an embodiment of the disclosure. The base station shown in FIG. 3 may implement the communication method in FIG. 2. Referring to FIG. 3, the base station 30 includes a transceiver 310, a storage medium 320, and a processor 330. The processor 330 is coupled to the transceiver 310 and the storage medium 320. The base station 30 may be, for example, a distribution unit (DU) 13 of the communication system 10 as shown in FIG. 1, and may communicate with multiple user equipment through the massive antenna MIMO 14. The term "base station" (BS) in the embodiment of the disclosure may be, for example, a synonym to variations or subvariants of "gNodeB" (gNB), "eNodeB" (eNB), node B, advanced BS (ABS), transmission reception point (TRP), unlicensed TRP, base transceiver system (BTS), access point, home BS, relay station, scatterer, repeater, intermediate node, intermediary, satellite-based communication base station, etc.

The transceiver 310 wirelessly transmits downlink signals and receives uplink signals. The transceiver 310 may be configured to transmit and receive signals at radio frequencies or at millimeter wave frequencies. The transceiver 310 may also perform operations such as low noise amplification, impedance matching, frequency mixing, up or down frequency conversion, filtering, amplification, and the like. The transceiver 310 may include one or more analog-to-digital (A/D) converters and digital-to-analog (D/A) converters configured to convert from an analog signal format to a digital signal format during uplink signal processing, and to convert from a digital signal format to an analog signal format during downlink signal processing. The transceiver 310 may further include an antenna array, which may include one or more antennas for transmitting and receiving omni-directional antenna beams or directional antenna beams. The antenna array may be a massive antenna, and the implementation method of the massive antenna include a variety of antenna types such as linear, rectangular, cylindrical, distributed, and an antenna array, etc.

The storage medium 320 may store computer programs. In one embodiment, the storage medium 320 is any type of fixed or movable random access memory (RAM), read-only memory (ROM), flash memory, hard disk drive (HDD), solid state drive (SSD), or similar elements, or a combination thereof. The storage medium 320 is used for storing multiple modules, computer programs or various application programs executable by the processor 330.

The processor 330 is responsible for the whole or a part of the operation of the base station 30. In one embodiment, the processor 330 is a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements, or a combination of the elements thereof.

In one embodiment, the processor 330 may include a quantum computing device. A quantum computing device is a device used to perform quantum computing. Quantum computing devices may use quantum bits (qubits) to represent data and use the principles of quantum mechanics to perform computation. In an embodiment, the processor 330 may include a quantum computing unit (QCU). A quantum computing unit refers to a processor that adds quantum computing functions to a traditional computer structure. This processor is compatible with conventional computers and may use quantum computing to speed up solving some complex problems.

Embodiments of the disclosure apply quantum mechanical estimation to channel state information (CSI) to describe channel characteristics adaptively and in real time, and determine a better transmission strategy.

Specifically, in a MIMO communication system, the transmission strategy must consider:

(1) How to correctly estimate the CSI matrix;
(2) When the channel is a time-varying channel, how to overcome the outdated information caused by feedback delay and processing delay;
(3) How to return suitable channel information under the limitation of limited feedback.

Embodiments of the disclosure use quantum mechanical estimation to overcome the above-mentioned problems. Due to its special quantum characteristics, quantum computing may meet the requirements of exponentially complex computing. It is very suitable for the estimation of a large number of channel information in the massive antenna, and may quickly calculate the channel characteristics to meet the requirements of real-time estimation.

Heisenberg's uncertainty principle is a principle of quantum mechanics. The main concept is that measurement cannot accurately determine the position of an object and its velocity (momentum) at the same time, because when measuring the position (momentum), the measurement inevitably affects its momentum (position). Before measurement, the object is in a physical state that may only be described by "wave function". The wave function may only represent where the object may be found, or the probability of measuring a certain momentum value. Until the moment of measurement, the wave function suddenly collapses and concentrates on the measured physical quantity.

In quantum mechanics, the Einstein-Podolsky-Rosen paradox (EPR) advances physicists' understanding of quantum mechanics. Before the publication of EPR papers, quantum measurement was often regarded as a kind of physical disturbance, which directly acts on the measured system. That is, based on the uncertainty principle, there is no so-called objective "reality", only the results obtained by observation, the law of causality becomes probability, and objects no longer have a certain position and velocity at the same time. This means that the state from the time interval of the pilot signal to the time interval of the next pilot signal on this one subcarrier wave cannot be determined. The EPR paradox points out that to measure the properties of a particle, it is not necessary to disturb the particle, instead, the properties of the particle may be predicted by measuring the properties of distant entangled particles.

For the channel estimation problem, since the CSI varies with time, it is meaningless to only discuss the static channel state. Quantum mechanics does not use determinism for the change of microscopic channel time, but has a "probability". It is necessary to consider the relative probability of the possible appearance of the channel state, so as to adaptively determine the corresponding transmission strategy. Therefore, the embodiment of the disclosure maps the channel state to the quantum channel state based on the principle of quantum entanglement, and the quantum channel fingerprint may be obtained by calculating the entanglement of the quantum channel state. The quantum channel fingerprint may obtain the probability number of the channel state via the quantum channel state, rather than being randomly determined or subjectively determined by experience.

An exemplary embodiment is given below to specifically describe the quantum channel estimation of the embodiment of the disclosure.

Figure 4:
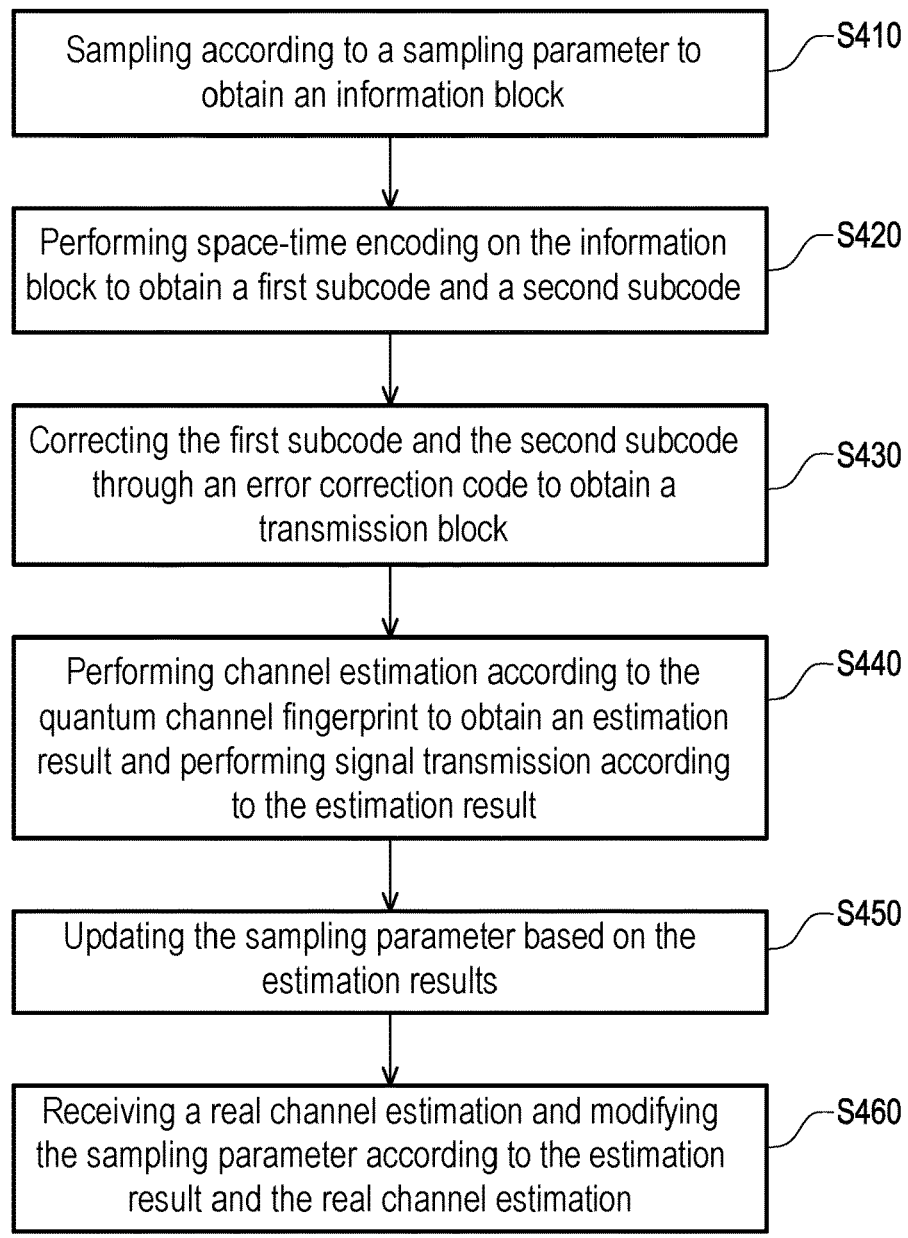
FIG. 4 is a flowchart of quantum channel estimation according to an exemplary embodiment of the disclosure.

FIG. 4 is a flowchart of quantum channel estimation according to an exemplary embodiment of the disclosure.

In step S410, an information block is obtained through sampling according to a sampling parameter, in which the sampling parameter is used to determine a time interval of a pilot signal. For $N_R$ reception antennas ($R_x$) and $N_T$ transmission antennas ($T_x$), at sampling time i, the response of the channel may be represented by a channel matrix H of dimension $N_R \times N_T$. The sampling parameter is related to the sample size. The sample size may be changed by adjusting the time interval of the pilot signal and adjusting the sampling interval as the channel time varies. Since the sample size affects the error and error rate of signal estimation, the adjustment of sampling parameter is very important. The embodiment of the disclosure controls the flow of information by using a gate design in the sampling process.

In an embodiment of the disclosure, the sampling parameters include a set gate, an output gate, and a stay gate, in which the set gate sets the time interval of the pilot signal, the output gate outputs the sampling information at the time interval, and the stay gate keeps the time interval of the pilot signal.

In one embodiment of the disclosure, sampling according to the sampling parameters to obtain the information block includes the following step. The set gate, the output gate, and the stay gate are set as the first time. The information block is obtained at the first time through the output gate.

Specifically, the set gate is set at the time interval of the pilot signal at the sampling time i. The output gate outputs the sampling information of the time interval at the sampling time i. When the time interval of the pilot signal does not change, the stay gate keeps the time interval of the pilot signal at the sampling time i+1 the same as the time interval of the pilot signal at the sampling time i. The operation of the gate in the sampling process may include an initialization, a setting step, an output step, an evaluation step, and an updating step. The detailed function of the gate is shown in FIG. 5 to FIG. 8 below.

Figure 5:
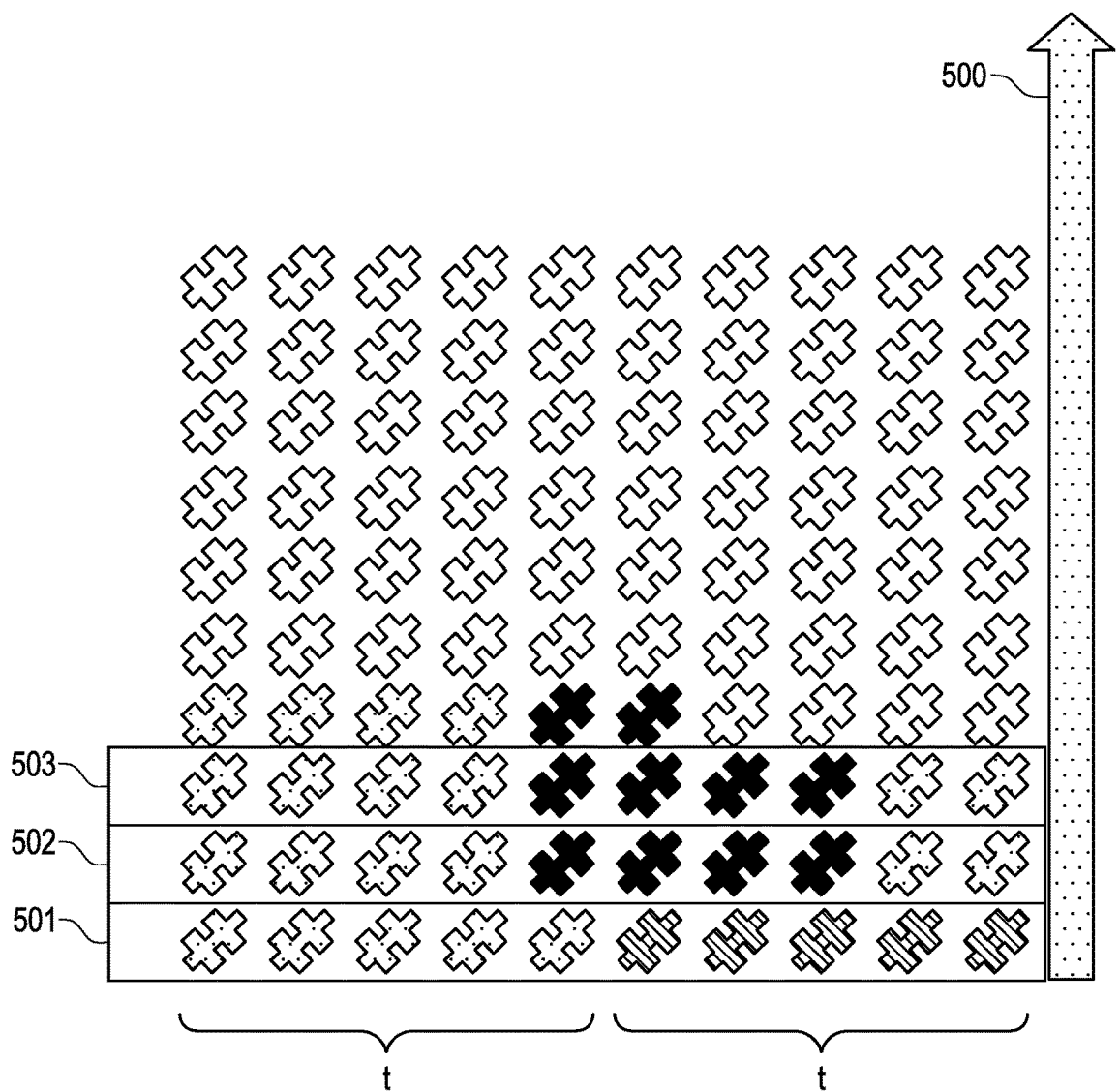
FIG. 5 is a schematic diagram of obtaining an information block through sampling according to a sampling parameter in an embodiment of the disclosure.
Figure 6:
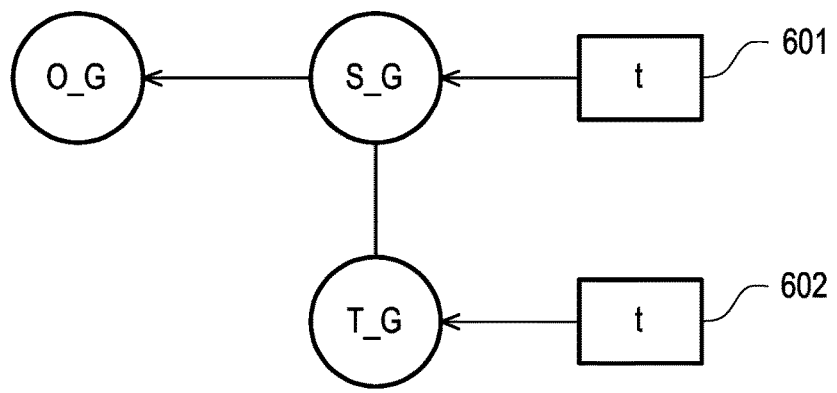
FIG. 6, FIG. 7, and FIG. 8 are schematic diagrams of a set gate, an output gate, and a stay gate according to an embodiment of the disclosure.
Figure 7:
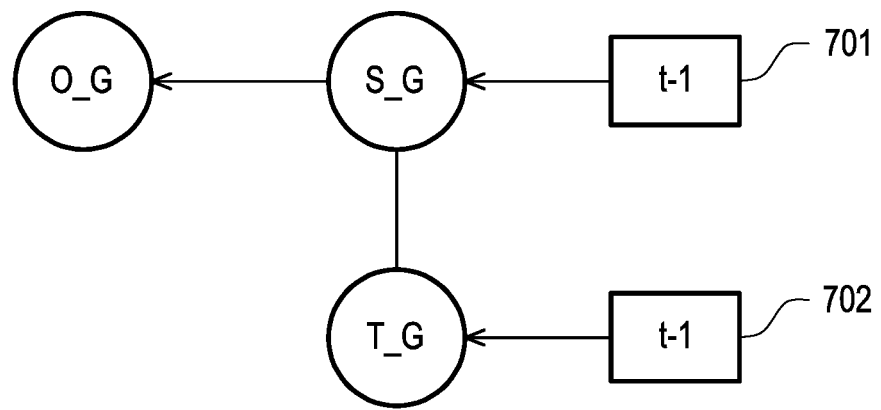
Figure 8:
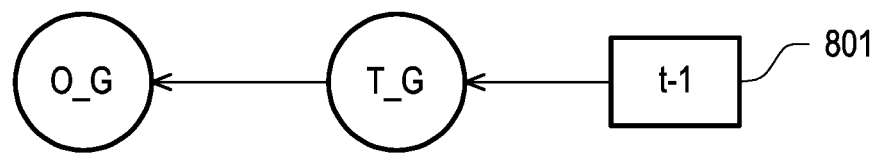

FIG. 5 is a schematic diagram of obtaining an information block through sampling according to a sampling parameter in an embodiment of the disclosure. FIG. 6, FIG. 7, and FIG. 8 are schematic diagrams of a set gate, an output gate, and a stay gate according to an embodiment of the disclosure.

Referring to FIG. 5, an upward arrow 500 represents the flow of information. The block 501 represents the information at sampling time i. The block 502 represents the information at sampling time i+1. The block 503 represents the information at sampling time i+2.

During initialization, the set gate, the output gate, and the stay gate are set to an initial value. Next, as shown in FIG. 5, before sampling the block 501, in the setting step, the set gate, the output gate, and the stay gate are set to first time "t".

At the sampling time i, as shown in FIG. 6, the time interval 601 of the set gate S_G and the time interval 602 of the stay gate T_G are also set to be the first time "t". At this time, in the output step, the output gate O_G obtains the information block at the time interval of the first time "t" at the sampling time i. In the evaluation step, the channel variation at the first time "t" is evaluated.

In an embodiment of the disclosure, the communication method further includes: updating the sampling parameter according to the estimation result. Specifically, at sampling time i+1, the set gate, output gate, and stay gate are updated according to the channel variation in the evaluation step.

In one embodiment of the disclosure, updating the sampling parameter according to the estimation result includes the following step. The channel variation at the first time is evaluated. In response to the channel variation being greater than a threshold value, the set gate is updated to second time, in which the second time is less than the first time. In response to the channel variation being less than the threshold value, the set gate is updated to third time, in which the third time is greater than the first time. In response to the channel variation being equal to the threshold value, the set gate is updated to the stay gate. The output gate and the stay gate are updated to the set gate.

For example, FIG. 7 shows the situation where the channel variation is greater than a threshold value. At this time, the time interval 701 of the set gate S_G is updated to the second time "t−1". The second time "t−1" is less than the first time "t". Then, the output gate O_G and the stay gate T_G are updated to the time interval 701 of the set gate S_G. Therefore, the time interval 702 of the stay gate T_G is updated to the second time "t−1".

At the sampling time i+2, as shown in FIG. 8, for example, in the situation that the channel variation is equal to the threshold value, the set gate S_G2 is updated to the stay gate T_G. At this time, the output gate O_G is set to the time interval 801 of the stay gate T_G, indicating that the time interval of the pilot signal is kept the same as the time interval of the pilot signal at the sampling time i+1.

Specifically, the time-varying nature of the channel is related to the relative moving speed of the transmitter and the receiver, and the embodiment of the disclosure adjusts the sampling interval through the function of the gates. When the relative moving speed of the transmitter and the receiver is fast and the channel changes greatly, the time interval between the pilot signals is reduced by the set gate. Conversely, when the channel variation is small, the time interval between pilot signals are increased.

Returning to the process shown in FIG. 4, the following steps of obtaining the information block are continued.

In step S420, the information block $s_i^{(k)}$ is subjected to space-time coding (STC) to obtain the first subcode $\breve{s}_i^{(k)}$ and the second subcode $\widetilde{s}_i^{(k)}$. The variable k represents the $k^{th}$ user. The variable k is between 1 and a positive integer K.

In detail, when there are K users and J receiving terminals, J≥K, the information block of the $K^{th}$ user at time i is $s_i^{(k)}=[s_i^{(k)}(0), s_i^{(k)}(1), \ldots, s_i^{(k)}(N-1)]$, N is the length of the transmitted information block. After the information block is encoded by STC, space-time trellis coding (STTC) $\breve{s}_i^{(k)}$ and space-time block coding (STBC) $\widetilde{s}_i^{(k)}$ are obtained.

In step S430, the first subcode and the second subcode are corrected by the error correction code to obtain a transmission block. In detail, at time i, each user uses two antennas $Tx_i^{(2k)}$ and $Tx_i^{(2k-1)}$ to transmit $\breve{s}_i^{(k)}$ and $\widetilde{s}_i^{(k)}$ signals, the data transmitted each time is a block data, and each block data has two symbols ($\breve{s}_i^{(k)}$ and $\widetilde{s}_i^{(k)}$). Specifically, the implementation of the error correction code is to use coding of orthogonal frequency division modulation (OFDM) that resist multipath interference, and in cooperation with methods such as cyclic prefix (CP) or zero-padding (ZP) and other methods that protects the coding of the interval, so as to resist inter-carrier inference (ICI) and inter-block interference (IBI) in wireless communication. Therefore, the transmission block received by the $j^{th}$ antenna at time i is $x_i^{(j)}=[x_i^{(j)}(0), x_i^{(j)}(1), \ldots, x_i^{(j)}(M-1)]^T$, where M=N+B, where B is the modulation content length of blocks such as ZP-OFDM and/or CP-OFDM. The transmission block received by a total of J array antennas at time i is $x_i(n)=[x_i^{(1)}(n), x_i^{(2)}(n), \ldots, x_i^{(J)}(n)]^T$.

In step S440, channel estimation is performed according to the quantum channel fingerprint to obtain an estimation result, and signal transmission is performed according to the estimation result. In one embodiment, the transmission block is represented as a tensor network structure. In one embodiment, a singular value decomposition (SVD) operation is performed on the tensor network structure to obtain the quantum channel fingerprint.

Figure 9:
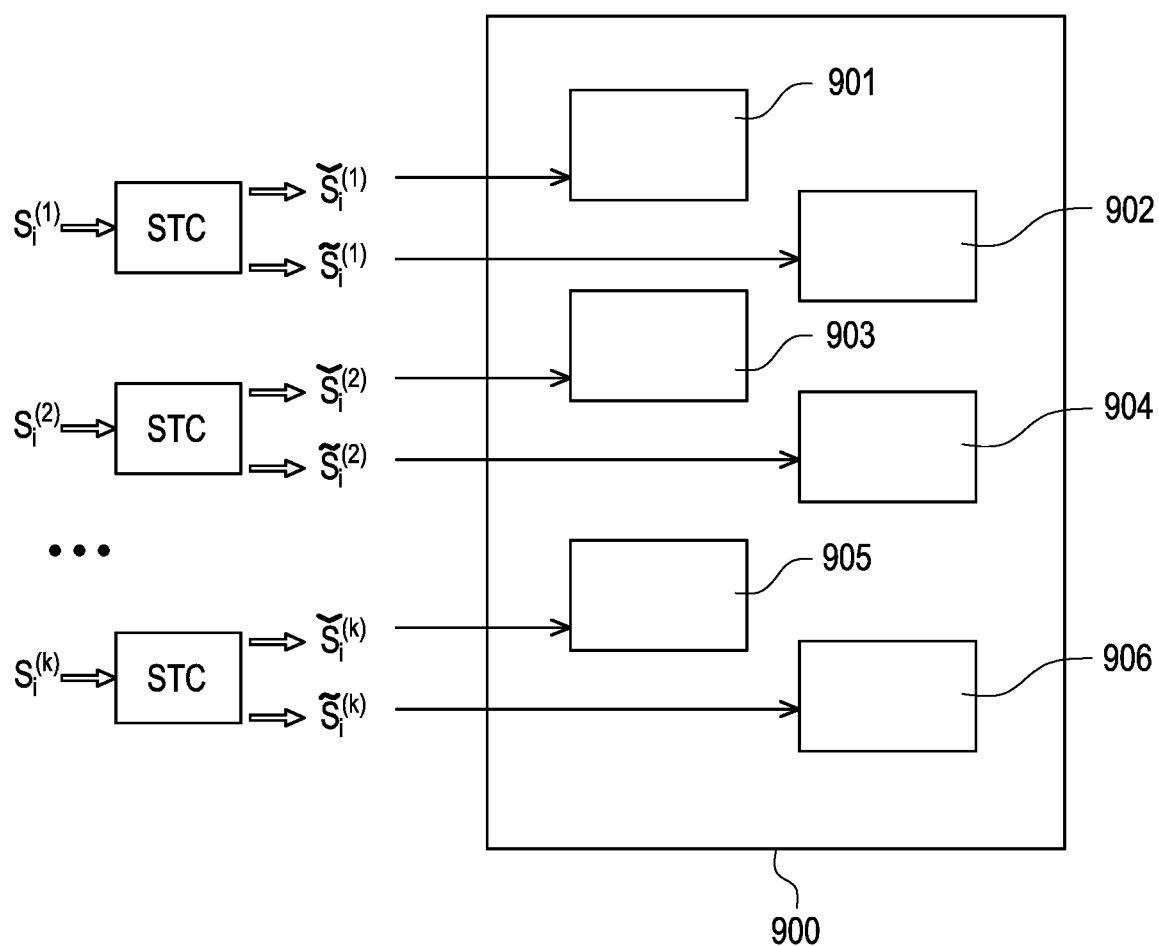
FIG. 9 is a schematic diagram of converting an information block into a quantum channel fingerprint in an embodiment of the disclosure.

FIG. 9 is a schematic diagram of converting an information block into a quantum channel fingerprint in an embodiment of the disclosure. After the information block $s_i^{(k)}$ is encoded by STC, the first subcode $\breve{s}_i^{(k)}$ and the second subcode $\widetilde{s}_i^{(k)}$ are obtained. The first subcode $\breve{s}_i^{(k)}$ and the second subcode $\widetilde{s}_i^{(k)}$ may be regarded as the quantum channel state (qubits channel state), and a series of matrices 901, 902, 903, 904, 905, and 906 in FIG. 9 represent a tensor network structure 900, and the tensor network structure may mathematically represent a subset of channel information blocks at sampling time i.

There is a basic assumption in quantum mechanics that the Hilbert space of a composite system is the tensor product of the Hilbert spaces of its subsystems. The wave function is the product of a series of matrices, that is, the matrix product state (MPS), which is a way to represent a one-dimensional tensor network. The left singular vector and the right singular vector obtained by singular value decomposition of the tensor are respectively formed with the ground state. This singular value decomposition is referred to as the Schmidt decomposition of the quantum state, which is the quantum state entanglement.

The information of different time blocks in each channel environment has correlation or quantum entanglement, the entanglement (Schmidt rank) for the quantum channel state is calculated, and the entanglement is used to indicate the importance of channel characteristics. The greater the importance of channel characteristics, the stronger the correlation. Specifically, the Schmitt decomposition of the wave function is an SVD operation, and the spectrum of the SVD operation is the square root of the eigenvalue of the simplified matrix. Therefore, by performing SVD operation on the covariance matrix of the channel information in the information block, the description of the quantum wave function structure may be obtained to obtain the quantum channel fingerprint.

The embodiment of the disclosure uses quantum mechanics to perform SVD calculation on the covariance matrix of the channel information, and then obtains the eigenvector and eigenvalue of the channel information as quantum channel fingerprints. For channel data, the eigenvector is the main component of the channel data, and the eigenvalue is the weight. After calculating the eigenvector and eigenvalue, which direction of the data is the main component in the scatter diagram may be known, and the main component is kept.

In an embodiment of the disclosure, performing channel estimation according to the quantum channel fingerprint to obtain the estimation result includes the following step. An entanglement is calculated from the quantum channel fingerprint as the estimation result, in which the entanglement represents the importance of channel characteristics. In an embodiment of the disclosure, performing the signal transmission according to the estimation result includes the following step. A reception antenna and a transmission antenna having the strongest correlation with the information block are found according to the entanglement to perform the signal transmission.

Figure 10:
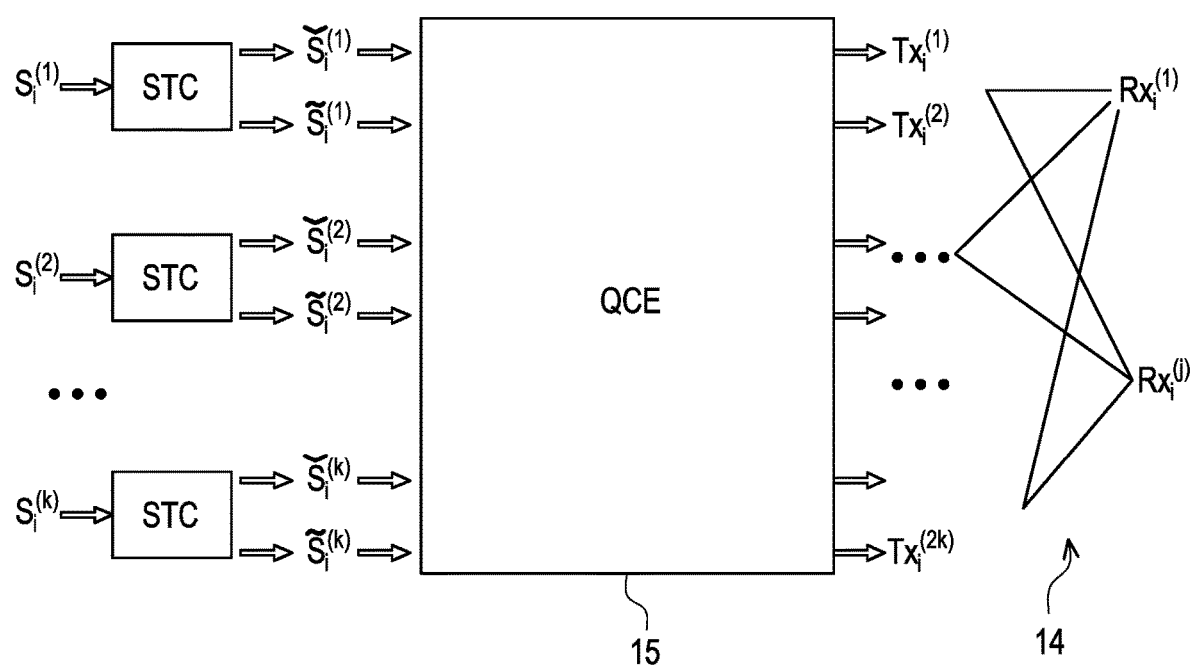
FIG. 10 is a schematic diagram of performing signal transmission according to an estimation result of the quantum channel fingerprint in an embodiment of the disclosure.

FIG. 10 is a schematic diagram of performing signal transmission according to an estimation result of the quantum channel fingerprint in an embodiment of the disclosure. As shown in FIG. 10, after the information block undergoes quantum channel estimation 15, the quantum channel fingerprint may become the channel estimation at time i. For example, in FIG. 10, the massive antenna 14 may transmit signals to suitable receiving terminal antenna $Rx_i^{(1)}$ and $Rx_i^{(j)}$ through transmission antennas $Tx_i^{(1)}$, $Tx_i^{(2)}$, . . . , $Tx_i^{(2k)}$ according to the channel estimation at time i. Therefore, the base station may transmit the correct beam to the user terminal according to the quantum channel fingerprint, thereby improving the transmission efficiency.

In step S450, the sampling parameter is updated according to the estimation result. The specific content of step S450 has been described in detail in step S410 and in FIG. 5 to FIG. 8 in regards to the updating step, and details are not repeated herein.

In step S460, an actual channel estimation is received and the sampling parameter is corrected according to the estimation result and the actual channel estimation. In an embodiment of the disclosure, correcting the sampling parameter according to the estimation result and the actual channel estimation includes the following step. The mean square error of the estimation result and the actual channel estimation is estimated. In response to the mean square error being greater than an error threshold value, the time interval of the pilot signal is reduced. In detail, the mean square error in step S460 may be calculated by the following Formula (2):

$$MMSE(h_{e_c}^{(j)}) = \arg \min_h E\{\|h_c^{(j)} - h_{e_c}^{(j)}\|_F^2\} \quad (2)$$

In Formula (2), $h_c^{(j)}$ represents the channel matrix of all users in cell c and the base station of target cell j. $h_{e_c}^{(j)}$ represents the estimation result. $h \in C^{J \times 1}$ is a complex gaussian distribution. It should be noted that h, $h_c^{(j)}$, $h_{e_c}^{(j)}$ are probability distributions.

Formula (2) uses the minimum mean square error (MMSE) to evaluate the transmission strategy. If the error exceeds an error threshold value, the sampling interval is corrected. For example, when the communication system has B cells, where B is an integer, each base station is equipped with J antennas, and the base station in each cell serves K single-antenna users at the same time, in which all users of all cells share the same time-frequency resources. Formula (2) may derive the transmission strategy applied on the information channel of the base station terminal in a target cell.

To sum up, the communication method based on quantum channel estimation and the base station provided in the embodiments of the disclosure include the following operation. Information block is obtained through sampling according to a sampling parameter. The information block is converted into a quantum channel fingerprint. Channel estimation is performed according to the quantum channel fingerprint to obtain an estimation result. Signal transmission is performed according to the estimation result. The quantum channel fingerprint may be used to represent the channel transmission scenario at a sampling time. Scenarios at different sampling time points have different quantum channel fingerprints. The channel transmission or pilot frequency distribution in this scenario may be explained by using the quantum channel fingerprint through quantum calculation. The advantage of the quantum channel fingerprint is that the probability number may be obtained via the quantum state, rather than being randomly determined or subjectively determined by experience. In an embodiment of the disclosure, gates are designed to control the flow of information in the sampling process, providing an adaptive sampling process. In an embodiment of the disclosure, the channel status at the sampling time point is described by the quantum channel fingerprint, and the quantum channel fingerprint combines quantum calculation and STC coding technology to provide channel estimation. In this way, the base station may transmit the correct beam to the user terminal, thereby improving the transmission efficiency.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A communication method based on quantum channel estimation, comprising:
sampling according to a sampling parameter to obtain an information block, wherein the sampling parameter is used to determine a time interval of a pilot signal;
converting the information block into a quantum channel fingerprint;
performing channel estimation according to the quantum channel fingerprint to obtain an estimation result; and
performing signal transmission according to the estimation result.

2. The communication method according to claim 1, wherein the sampling parameter comprises a set gate, an output gate, and a stay gate, wherein the set gate sets the time interval of the pilot signal, the output gate outputs sampling information at the time interval, and the stay gate keeps the time interval of the pilot signal.

3. The communication method according to claim 2, wherein sampling according to the sampling parameter to obtain the information block comprises:
setting the set gate, the output gate, and the stay gate to first time; and obtaining the information block at the first time through the output gate.

4. The communication method according to claim 3, further comprising:
updating the sampling parameter according to the estimation result.

5. The communication method according to claim 4, wherein updating the sampling parameter according to the estimation result comprises:
evaluating channel variation at the first time;
in response to the channel variation being greater than a threshold value, updating the set gate to second time, wherein the second time is less than the first time;
in response to the channel variation being less than the threshold value, updating the set gate to third time, wherein the third time is greater than the first time;
in response to the channel variation being equal to the threshold value, updating the set gate to the stay gate; and
updating the output gate and the stay gate to the set gate.

6. The communication method according to claim 2, further comprising:
receiving an actual channel estimation; and
correcting the sampling parameter according to the estimation result and the actual channel estimation.

7. The communication method according to claim 6, wherein correcting the sampling parameter according to the estimation result and the actual channel estimation comprises:
estimating the estimation result and mean square error of the actual channel estimation; and
in response to the mean square error being greater than an error threshold value, reducing the time interval of the pilot signal.

8. The communication method according to claim 1, wherein converting the information block into the quantum channel fingerprint comprises:
performing space-time coding on the information block to obtain a first subcode and a second subcode;
correcting the first subcode and the second subcode through an error correction code to obtain a transmission block;
representing the transmission block as a tensor network structure; and
performing singular value decomposition operation on the tensor network structure to obtain the quantum channel fingerprint.

9. The communication method according to claim 1, wherein performing channel estimation according to the quantum channel fingerprint to obtain the estimation result comprises:
computing entanglement from the quantum channel fingerprint as the estimation result, wherein the entanglement represents importance of the channel characteristic.

10. The communication method according to claim 9, wherein performing the signal transmission according to the estimation result comprises:
finding a reception antenna and a transmission antenna having a strongest correlation with the information block according to the entanglement to perform the signal transmission.

11. A base station, comprising:
a transceiver;
a storage medium; and
a processor, coupled to the transceiver and the storage medium, wherein the processor is configured to:
sample according to a sampling parameter to obtain an information block, wherein the sampling parameter is used to determine a time interval of a pilot signal;
convert the information block into a quantum channel fingerprint;
perform channel estimation according to the quantum channel fingerprint to obtain an estimation result; and
perform signal transmission according to the estimation result.

12. The base station according to claim 11, wherein the sampling parameter comprises a set gate, an output gate, and a stay gate, wherein the set gate sets the time interval of the pilot signal, the output gate outputs sampling information at the time interval, and the stay gate keeps the time interval of the pilot signal.

13. The base station according to claim 12, wherein the processor is further configured to:
set the set gate, the output gate, and the stay gate to first time; and
obtain the information block at the first time through the output gate.

14. The base station according to claim 13, wherein the processor is further configured to:
update the sampling parameter according to the estimation result.

15. The base station according to claim 14, wherein the processor is further configured to:
evaluate channel variation at the first time;
in response to the channel variation being greater than a threshold value, update the set gate to second time, wherein the second time is less than the first time;
in response to the channel variation being less than the threshold value, update the set gate to third time, wherein the third time is greater than the first time;
in response to the channel variation being equal to the threshold value, update the set gate to the stay gate; and
update the output gate and the stay gate to the set gate.

16. The base station according to claim 12, wherein the processor is further configured to:
receive an actual channel estimation; and
correct the sampling parameter according to the estimation result and the actual channel estimation.

17. The base station according to claim 16, wherein the processor is further configured to:
estimate the estimation result and mean square error of the actual channel estimation; and
in response to the mean square error being greater than an error threshold value, reduce the time interval of the pilot signal.

18. The base station according to claim 11, wherein the processor is further configured to:
perform space-time coding on the information block to obtain a first subcode and a second subcode;
correct the first subcode and the second subcode through an error correction code to obtain a transmission block;
represent the transmission block as a tensor network structure; and
perform singular value decomposition operation on the tensor network structure to obtain the quantum channel fingerprint.

19. The base station according to claim 11, wherein the processor is further configured to:
compute entanglement from the quantum channel fingerprint as the estimation result, wherein the entanglement represents importance of the channel characteristic.

20. The base station according to claim 19, wherein the processor is further configured to:

find a reception antenna and a transmission antenna having a strongest correlation with the information block according to the entanglement to perform the signal transmission.

\* \* \* \* \*